J. R. HARPER.
ROTARY ENGINE.
APPLICATION FILED DEC. 7, 1912.

1,098,256.

Patented May 26, 1914.

Witnesses:
M. E. Clark
J. W. Michael Jr.

Inventor
John R. Harper
By Edson Bros
Attorneys

J. R. HARPER.
ROTARY ENGINE.
APPLICATION FILED DEC. 7, 1912.

1,098,256.

Patented May 26, 1914.

Witnesses:
M. E. Clark.
J. W. Michael Jr.

Inventor:
John R. Harper

By Edson Bros
attorneys

UNITED STATES PATENT OFFICE.

JOHN ROBT. HARPER, OF SOUTH HACKNEY, LONDON, ENGLAND.

ROTARY ENGINE.

1,098,256.

Specification of Letters Patent.　　Patented May 26, 1914.

Application filed December 7, 1912. Serial No. 735,436.

*To all whom it may concern:*

Be it known that I, JOHN ROBERT HARPER, a subject of the King of Great Britain, residing at 33 Groombridge road, South Hackney, in the county of London, England, have invented certain new and useful Improvements in or Relating to Rotary Engines Applicable for Employment as a Pump, Compressor, or the like, of which the following is a specification.

This invention relates to rotary engines of the type in which a rotary abutment is employed in conjunction with one or more motor disks or rotors which are adapted to engage by means of projections, and corresponding depressions respectively, into which latter the steam or other motive fluid is admitted, the chief object being to economize in the consumption of steam or other motive fluid and thereby increase the efficiency of the engine.

Other objects of the invention are to render the various members of the engine fluid tight, to arrange the parts in such a manner as to allow for the expansion thereof and to provide improved means for taking up wear in the various members of the engine.

The apparatus is applicable for employment as a pump, compressor or the like in either of which uses the apparatus is driven instead of acting as the prime mover. Obviously also the apparatus is capable of employment as an internal combustion engine.

An essential feature of the present invention resides in the fact that by means of a by-pass formed in the valve pertaining to the exhaust passage the pressure of the motive fluid is enabled to act on the motor disk or rotor for a larger part of the revolution than heretofore and the extent or capacity of the exhaust passage on the driving side of the engine is reduced. According to this invention, therefore, the capacity of the exhaust ports or passages leading to the exhaust valves is considerably diminished and the ports or passages are so arranged that the steam or other motive fluid in the depressions in the rotary abutment is adapted to act expansively on the motor disks or rotors for a longer period of the revolution than has heretofore been the case with engines of this character. To this end the exhaust valves are brought into close proximity to the rotary abutment and are provided with two ports or passages one of which is radially arranged and leads from the periphery or outer surface of the valve to the main exhaust port and the other of which is arranged circumferentially or on the outer surface of the exhaust valve so as to form a by-pass between two short ports or passages of small volume formed in the casing of the engine between the exhaust valve and the rotary abutment. Each valve may therefore be set with the radial port therein in engagement with one of the ports in the casing so as to place the depressions in the abutment in communication with the exhaust outlet, or, it may be set so that the circumferential port or passage may form a by pass or serve to short circuit the two ports or passages in the casing of the engine. It will be understood that each exhaust valve is provided with the aforesaid openings and is adapted to act as an exhaust or by pass valve in the manner described.

In order that the said invention may be clearly understood and readily carried into effect, I will proceed to describe the same with reference to the accompanying drawings in which:—

Fig. 2 is a plan thereof with the upper portion of the casing removed. Figs. 3 and 4 are detail views of the operating handles or levers and the internal sleeves for controlling the cut off and reversal of the engine. Fig. 5 is an end view of the rotary abutment and Fig. 6 a sectional view, the right hand portion of which is taken on the line 6—6 of Fig. 5, and the left hand portion on the line 7—7 thereof. Fig. 6ª is a back view of a modified form of packing for the rotary abutment. Figs. 6ᵇ and 6ᶜ are respectively a sectional elevation and an outside elevation of the end of the abutment with the packing applied thereto. Figs. 9 to 11 are detail views of the packing members. Fig. 9 being a face view, Fig. 10 a section taken on the line 10—10 of Fig. 9 and Fig. 11 a section taken on the line 11—11. Fig. 12 is a sectional view of one of the rotary pistons.

14, 15, and 16 are cross sectional views taken on the lines 14—14, 15—15, 16—16 respectively, of Fig. 13.

Figures 2, 5:
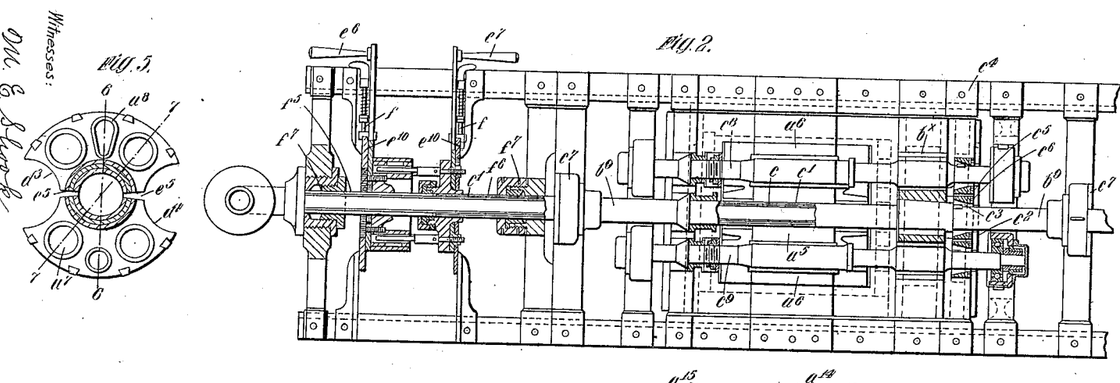
Figure 6:
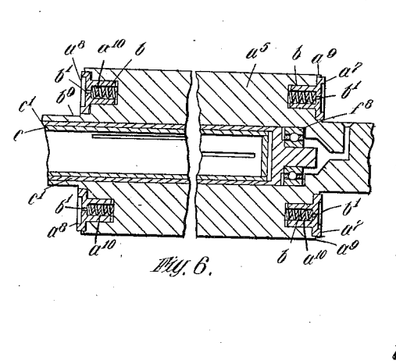
Figures 6A, 6B, 6C, 7:
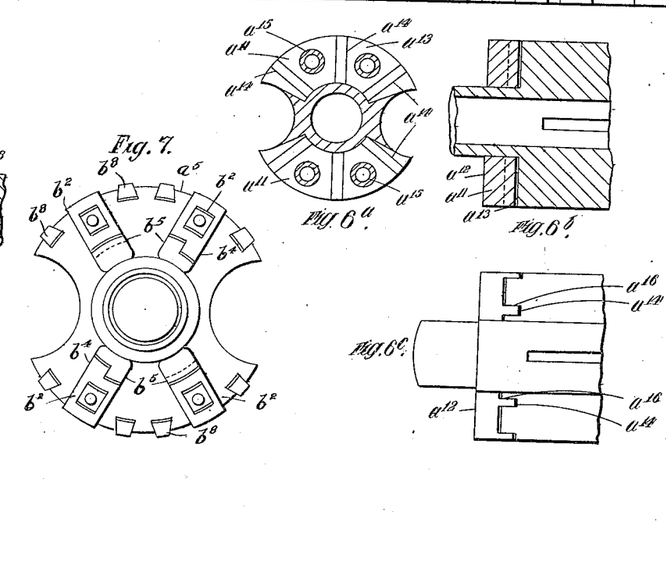
Fig. 7 is an end view of another rotary abutment having a modified form of packing members and Fig. 8 a partial longitudinal view thereof.
Figure 13:
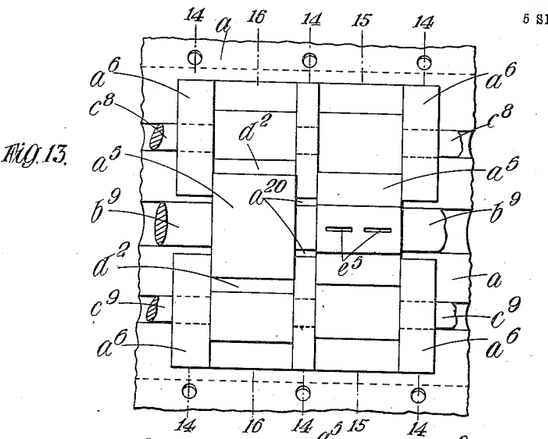
Fig. 13 is a partial plan view of a form of the engine in which the rotors are balanced on the rotor shafts, the top half of the casing being removed. Figs.
Figure 14:
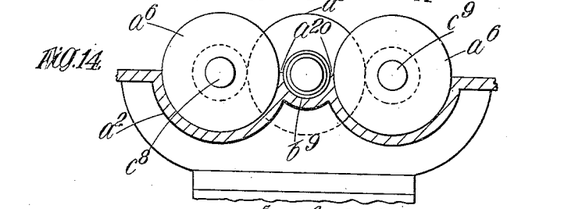

The engine comprises an outer casing $a$ which is divided into suitable sections or parts $a'$, $a^2$, which are supported on its axial line $a^3$, $a^3$ by means of self contained or separately constructed bearers $a^4$ or their equivalents. This latter arrangement is of considerable importance as it permits of the several parts of the casing expanding without affecting the axial line $a^3$, $a^3$ of the same, the expansion taking place freely on either side of the axial line. The interior of the casing is adapted to receive a rotary abutment $a^5$ and one or more disks or rotors $a^6$ which are adapted to co-act with the abutment, in the usual manner, to generate power, when steam is admitted to the co-acting surfaces thereof. The rotary abutment $a^5$, Figs. 5 and 6, may be made hollow or solid and its ends are provided with suitable packing pieces $a^7$ $a^8$ which are adapted to make a fluid-tight joint between the ends of the abutment and the casing of the engine. Any suitable number of packing pieces may be provided and they may be formed as circular flanged members $a^7$ placed in suitable recesses or openings $a^9$ formed in the ends of the abutment. The packing pieces may be formed with internal spaces or chambers $a^{10}$ into which springs $b$ or the like are placed, these latter serving to press the packing pieces against the casing to make the necessary fluid tight joints. In order to allow of the air or other fluid which may be contained in the recesses or openings $a^{10}$ in the ends of the abutments, escaping when the abutment is heated, suitable vents $b'$ are provided in the packing pieces $a^7$, $a^8$ so that all danger of fracture or inconvenience owing to the entrapping of the fluid in the said recesses is effectively avoided. The packing pieces may be formed as shown in Fig. 6$^a$, and comprise segmental members $a^{11}$ having plain or recessed front faces $a^{12}$. The rear face $a^{13}$ may be provided with radial ribs $a^{14}$ and raised hollow studs $a^{15}$ adapted to fit accurately into corresponding recesses $a^{16}$ formed in the ends of the rotary abutment. These hollow studs are adapted to receive spiral springs or similar devices which serve to press the segmental members $a^{11}$ against the casing of the engine. As the studs $a^{15}$ are fitted into the ends of the abutment they prevent the segmental members $a^{11}$ being displaced by centrifugal action during the rotation of the abutment. Instead of making the packing pieces of circular formation they may be formed as sliding bars or plates $b^2$ of suitable dimensions (Figs. 7 to 11) which are capable of allowing for expansion in their length radially of the abutment $a^5$ in which they are arranged. The bars or plates $b^2$ are preferably made of dovetail or similar section and are fitted into correspondingly shaped openings $b^3$ formed in the rotary abutment. Each bar or plate $b^2$ is formed of two or more parts $b^4$, $b^5$ which are jointed together in any suitable manner to allow for relative movement. In this connection the adjacent ends of the parts $b^4$, $b^5$ of the packing piece $b^6$ may be overlapped so as to make a broken joint, $b^6$ Figs. 9 and 10, this joint is maintained by a spring or springs $b^7$ acting on the part $b^5$ and serving to maintain it in engagement with the other part $b^4$ of the packing piece. It will thus be seen that the packing piece $b^2$ is free to expand along its length, for the aforesaid retaining spring or springs $b^7$ will allow of such movement taking place. Additional springs may be provided for allowing of the movement of the packing pieces in a direction normal to their length and in this manner a perfect compensation for expansion is obtained. Suitable packing pieces $b^8$ may also be employed for the periphery of the abutment. As previously stated the rotary abutment $a^5$ may be made solid or hollow and in the former case its mass may perform the functions of a fly-wheel. The rotary abutment has to be perfectly balanced and if necessary may be lightened at various parts by drilling or boring, the holes thus made being plugged at their ends or being arranged so as to receive suitable balance weights for effecting the desired adjustment. When the abutment is of considerable dimensions the aforesaid holes may be carried right through the same and the end plugs thereof be provided with suitable vent holes or relief valves.

The rotary abutment $a^5$ is formed on or carried by a suitable shaft $b^9$ which is made hollow so as to allow of the admission of steam to the interior of the abutment, the admission and control of the steam being effected by means of concentrically arranged sleeves or members $c$, $c'$ which enter the hollow shaft $b^9$ and which are operated from the exterior as will be hereinafter described. The abutment shaft $b^9$ is provided with conical bearings $c^2$ which are adapted to receive conical members $c^3$ turned solid with the shaft or accurately and firmly fitted thereto in any suitable manner. The conical bearings $c^2$ may be made solid or in halves and are arranged in housings carried by suitable cross pieces or bearers $c^4$ mounted on the supporting framing of the engine. These conical bearings $c^2$ are spring controlled and mounted in their housings in such a manner as to allow of axial or longitudinal movement. The conical members $c^3$ on the shaft are retained longitudinally by conical rings or sectors $c^5$ which are retained in engagement therewith by springs $c^6$. In addition to the aforesaid conical bearings the abutment shaft is provided with ball or roller bearings $c^7$ so that the frictional resistance during the running of the shaft is reduced to a minimum.

Figure 1:
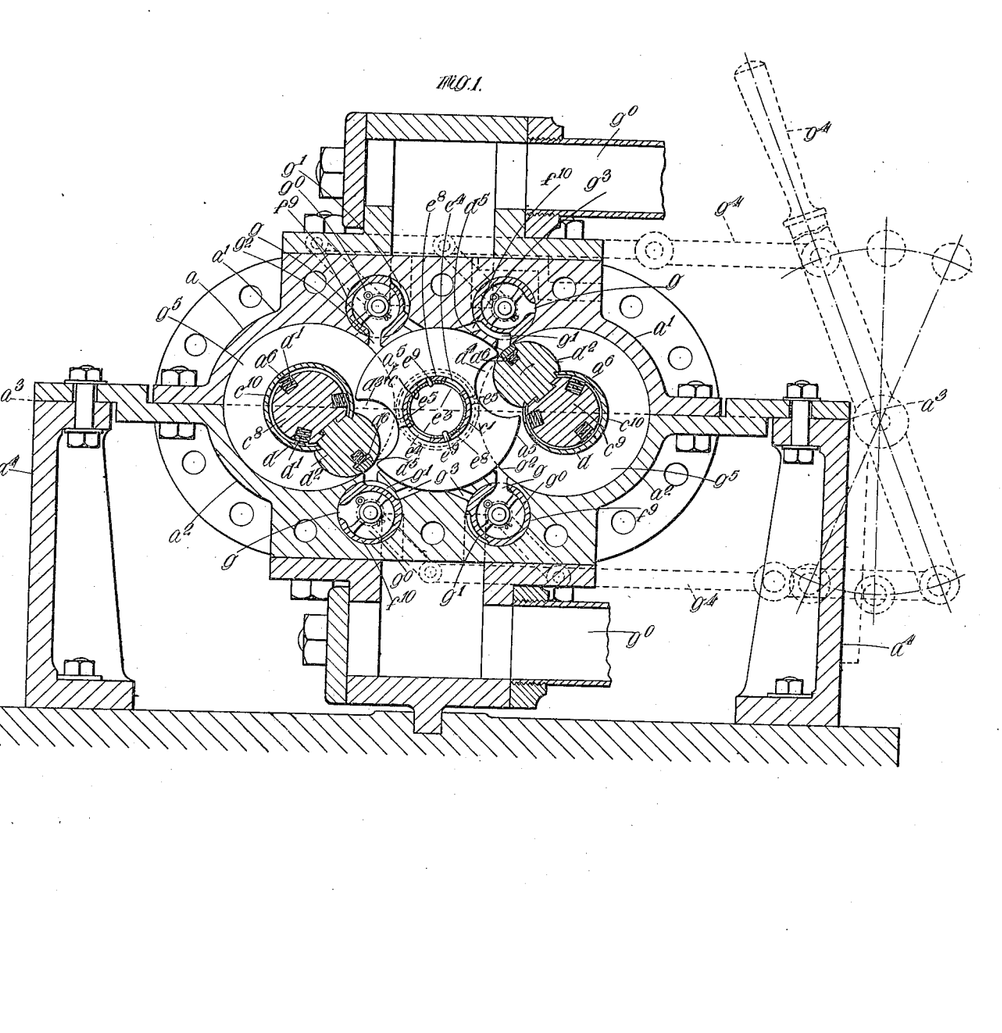
Figure 1 is a vertical section through a simple form of the improved rotary engine.
Figures 4, 9, 10, 11, 12:
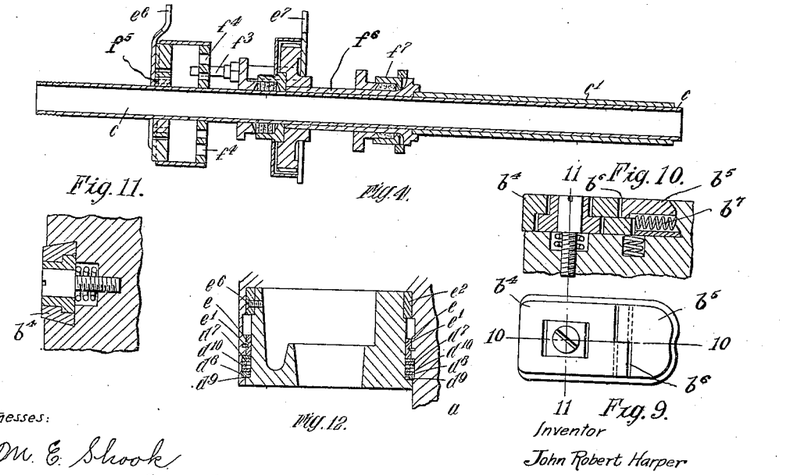

The shaft $b^9$ of the rotary abutment $a^5$ is connected through a 2 to 1 gearing, $b^x$, with one or more rotor or motor wheel shafts $c^8$, $c^9$ which carry the rotor or motor wheels $a^6$ which co-act with said abutment to generate power from the motive medium. These rotor wheels $a^6$ Figs. 1 and 12, are arranged so that their axle bodies $c^{10}$ which are formed by resilient members $d$ covering the axles thereof, engage with the periphery of the rotary abutment in a similar manner to the pitch circles of gear wheels. The body $c^{10}$ of the left hand rotor $a^6$, Fig. 1, is pressed outwardly by the springs $d'$ while the right hand rotor is provided with a body $c^{10}$ which is retained in position by its inherent resiliency. A tongue or projection $d^2$ is formed on each of the rotor wheels $a^6$ and is arranged to mesh with hollow gaps or openings $d^3$, $d^4$ formed in the rotary abutment. The tongue $d^2$ may be formed as a part of an ellipse or of a circle, the latter form offering a large contact surface and more effectually preventing the escape or leakage of the motive fluid. The tip $d^5$ of the tongue is provided with a dovetailed resilient bar $d^6$ or other form of fluid tight jointing member. In the arrangement shown the tongue or projection $d^2$ on each rotor $a^6$ would be adapted to engage successively with the hollow gaps or openings $d^3$, $d^4$ in the abutment $a^5$ and the tongue and gaps would always register correctly owing to the external gearing connecting the abutment shaft $b^9$ with the shafts $c^8$, $c^9$ of the rotors. In order to render the rotors $a^6$ steam or fluid tight their peripheries are provided with a number of continuous packing rings $d^7$ (Fig. 12) the outer one $d^8$ of which on each rotor is made of sufficient thickness to allow of a small rabbet $d^9$ being made therein so as to compensate for its displacement due to the difference in expansion between the rotor and the casing. The aforesaid packing rings $d^7$ are adapted to enter circumferential grooves $d^{10}$ formed in the casing $a$ of the engine and are retained in position by a suitable junk ring $e$ which is adapted to move freely on the rotor but secured to the casing by a solid ring $e'$, an externally disposed junk ring $e^2$ serving to hold the parts together. By arranging the packing rings in this manner the rotor is free to expand longitudinally or axially without affecting the tightness of the joint between itself and the casing or any other form of labyrinth packing may be used.

The interior of the hollow shaft $b^9$ of the abutment $a^5$ is provided with two concentric sleeves $c$, $c'$, previously referred to, which constitute the steam controlling device for the engine. Passages or ports $e^3$, $e^4$ are formed in the two concentric sleeves and these latter are capable of being set to register with corresponding passages $e^5$ formed in the rotary abutment $a^5$ and these ports lead into the hollow gaps $d^3$, $d^4$ formed therein, so that during the rotation of the abutment motive fluid may pass from the inner sleeve $c$ through the ports in the outer sleeve $c'$ into the said hollow gaps to act on the tongues $d^2$ of the rotors and impart movement thereto.

Figures 3, 8:
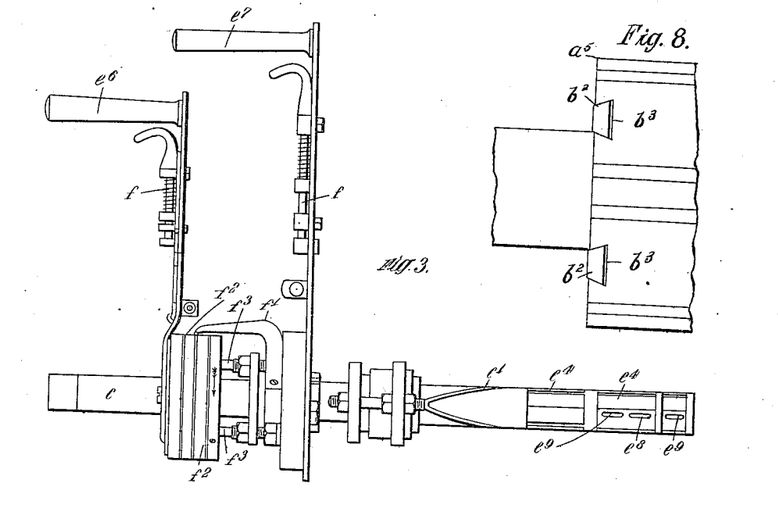

The rotary movement of the abutment $a^5$ is in conjunction with the sleeves $c$, $c'$ which latter, by means of the external operating handles or levers $e^6$, $e^7$ Figs. 3 and 4, are adapted to make a partial rotation in the hollow shaft or axle $b^9$ pertaining to the abutment, and which serve to effect the adjustment or variation of the cut-off and the reversal of the engine; the latter being accomplished in a ready and expeditious manner. The inner sleeve $c$ is provided with a piece or with pieces $e^8$, Fig. 1, of sectional or segmental formation, same being carried by means of pins or pegs $e^9$ adapted to enter slots or holes formed in the sleeve; the arrangement being such that sufficient room is available axially for expansion and facility in properly disposing the said pieces $e^8$. The latter are adapted to make a fit lengthwise in the openings or ports $e^4$ formed for their reception in the outer sleeve $c'$ but they are of such a measurement transversely or circumferentially as to allow the sleeves to move angularly for a certain degree, say, a distance equivalent to one sixth of their circumference, thereby acting as a partially rotating valve or shutter. The sleeves $c$, $c'$ are arranged so as to be capable of being set relatively to each other so that the one may be moved rotatively through a certain limited arc while the other is stationary. Both sleeves are adapted to serve as a stationary and a movable sleeve according to the direction of running. In working the device, the sleeve which becomes the fixed sleeve, has a fixed admission edge for the steam or other motive fluid and this will remain so until the direction of the engine is reversed. Thus the period of admission is set for each revolution. The movable sleeve is actuated rotatively by one of the aforesaid external handles or levers $e^6$, $e^7$ pertaining thereto. The inner sleeve $c$ whereby the shutters $e^8$ are carried may be regarded as the movable sleeve when the engine is running in the one direction the other or outer sleeve $c'$ being the movable sleeve when the engine is reversed or running in the other direction. The sleeves may be provided with notched quadrants $e^{10}$, Fig. 2, and spring controlled stops $f$, Fig. 3, in conjunction with suitable indicating means, such as pointers $f'$ moving over suitable graduated drums or members $f^2$. There is, moreover, provision for limiting the movement to a predetermined degree to correspond with the dimensions of the ports in the sleeves. The movement may be limited by two or more pins or projections $f^3$ on the one member engaging in suitable slots $f^4$ formed in the other member.

When the sleeves are set for reversing the engine the ports $e^3$, $e^4$ therein will be in a position diametrically opposed to that which they assumed for the other direction of running. The setting of the concentric sleeves $c$, $c'$ is effected by moving the levers $e^6$, $e^7$ pertaining thereto over the graduated drums or members $f^2$; the sectors or quadrants $e^{10}$ serve to lock the levers in the positions to which they are set and with this object in view the levers are provided, as previously mentioned, with spring controlled catches or bolts $f$ which are adapted to engage with suitable slots or notches formed in the sectors or quadrants $e^{10}$. The inner concentric sleeve $c$ is carried beyond the outer sleeve $c'$ and the extended portion thereof has another sleeve $f^5$ secured thereto and this latter sleeve is operatively connected to the setting handle or lever $e^6$. The outer concentric sleeve $c'$ is also provided with a sleeve $f^6$ which embraces the portion thereof which extends beyond the extremity of the shaft $b^9$ of the abutment $a^5$, and this sleeve is connected in a manner similar to that previously described, to the other setting lever $e^7$. In this way the pipe or passage for the motive fluid is of uniform dimensions throughout its length and consequently is of uniform strength. The aforesaid concentric sleeves $c$, $c'$ pass through suitable glands and stuffing boxes $f^7$ arranged outside the casing of the engine and the inner extremity thereof contained within the interior of the rotary abutment $a^5$ is carried by a ball bearing $f^8$, Fig. 6.

The rotary abutment $a^5$ may be adapted to act in conjunction with one or more rotors $a^6$ and when two rotors are provided the abutment would be centrally arranged between the same as shown in Fig. 1. Suitable exhaust valves $f^9$, $f^{10}$ would be arranged in the casing $a$ above and below the rotary abutment and in close proximity thereto. With two rotors $a^6$ four exhaust valves are provided two above and two below the rotary abutment $a^5$. Each valve would be provided with two ports or passages $g$, $g'$, the former a radially disposed passage leading from the periphery or outer surface thereof to the main exhaust $g^0$, and the latter a circumferential passage or a passage made on the outer surface or periphery of the valve. The passage $g'$ is adapted to short circuit or form a by-pass between two short ports or passages $g^2$, $g^3$ formed in the casing of the engine at different points around the periphery of the rotary abutment, while the passage $g$ is only adapted to be brought into engagement with the passage $g^2$ in the casing. Each valve $f^9$, $f^{10}$ would be provided with similar ports or passages $g$, $g'$ and suitable lever and link mechanism $g^4$ is provided for actuating the four exhaust valves simultaneously, so that each pair of diametrically opposed valves viz.: $f^9$, $f^9$ and $f^{10}$, $f^{10}$ would be set in the same position. In Fig. 1 the valves $f^9$ are shown communicating with the passages $g^2$ in the casing $a$ and the exhaust $g^0$, and the valves $f^{10}$ short circuiting or forming a by-pass between the passages $g^2$, $g^3$ in the casing. By arranging the exhaust valves in this manner the clearance or waste space in the exhaust passages or ports $g^2$ $g^3$ is considerably reduced and the motive fluid is capable of acting on the rotary abutment and rotors for a longer period of the revolution than has heretofore been the case. The abutment $a^5$ during its revolution will first of all bring the port or opening $e^5$ therein to register with the openings $e^3$ $e^4$ in the concentric sleeves $c$, $c'$ and the motive fluid will enter the hollow gap $d^3$ or $d^4$ therein to act upon the tongue $d^2$ of the rotor $a^5$. Motive fluid will continue to enter the gap $d^3$ in the abutment while the ports or passages $e^3$, $e^4$, $e^5$, are in engagement but so soon as the port $e^5$ in the abutment passes over the ports $e^3$, $e^4$ in the concentric sleeves the supply of motive fluid will be cut off. The further movement of the abutment $a^5$ will cause the tongue $d^2$ of the rotor to leave the hollow gap therein and the motive fluid will act expansively on said tongue for the remaining part of the revolution. The gap $d^3$ or $d^4$ in the rotary abutment $a^5$ will now pass one of the exhaust valves $f^9$, $f^{10}$ which is set so as to short circuit the ports or passages $g^2$ $g^3$, formed in the casing $a$ of the engine, and as the port $g^2$ communicates with the space $g^5$ in which the rotor $a^6$ works the motive fluid remaining in the gap in the abutment will be able to flow through the by-pass and ports into the space $g^5$ to act on the rotor. In this manner the motive fluid in the gap $d^3$ is adapted to act on the rotor $a^6$ long after the steam in the ordinary way would have been cut off from the rotor. After leaving this exhaust valve the abutment will come to the second valve and the motive fluid in the hollow gap $d^3$ therein will be exhausted, as the port in this valve will be in communication with the main exhaust passage $g^0$. The space $g^5$ in which the rotor $a^6$ moves will also be placed in communication with the exhaust when the tongue or projection $d^2$ thereon has passed the port in said valve. The same cycle of operations will take place during each half revolution of the rotary abutment $a^5$ for each hollow gap $d^3$ therein.

The reversing of the engine is effected by changing the positions of the exhaust valves $f^9$, $f^{10}$ and at the same time imparting the desired angular movement to the concentric controlling sleeves $c$, $c'$.

The balancing of the motor wheels or rotors $a^6$ on the rotor shaft may be effected by arranging the rotor tongues $d^2$ between the rotor wheels along the length of the shaft on opposite sides thereof. Perfect balance may thus be obtained without the provision of additional balance weights on the motor wheels.

Figure 15:
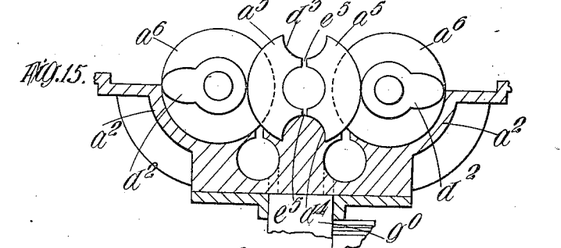
Figure 16:
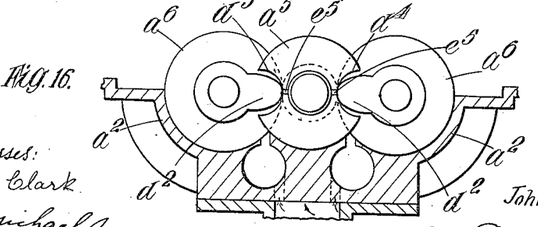

Referring to Figs. 13 to 16 the cylindrical chamber $a$ containing the rotor disks $a^6$ and the abutment may be divided into two equal parts by a dividing wall or partition $a^6$ and the rotor tongue $d^2$ may be divided into a corresponding number of parts arranged between two motor or rotor disks $a^6$ and on opposite sides of the rotor shaft see Figs. 15 and 16. The rotor disks $a^6$ work in openings formed in said partitions and constitute a part thereof, Fig. 14. The rotary abutment $a^5$ is also divided but as it only travels at half the speed of the rotor $a^6$, the gaps $d^3$, $d^4$ in the respective parts thereof are arranged at right angles to each other. The admission ports $e^5$ are formed in the gaps in the abutment as in the previously described arrangement and the abutment is carried through the several parts or compartments of the engine. This arrangement is of considerable importance as it enables perfect balance to be obtained and also renders the engine self-starting and reversible when the admission sleeves and exhaust valves are correctly manipulated.

Figure 17:
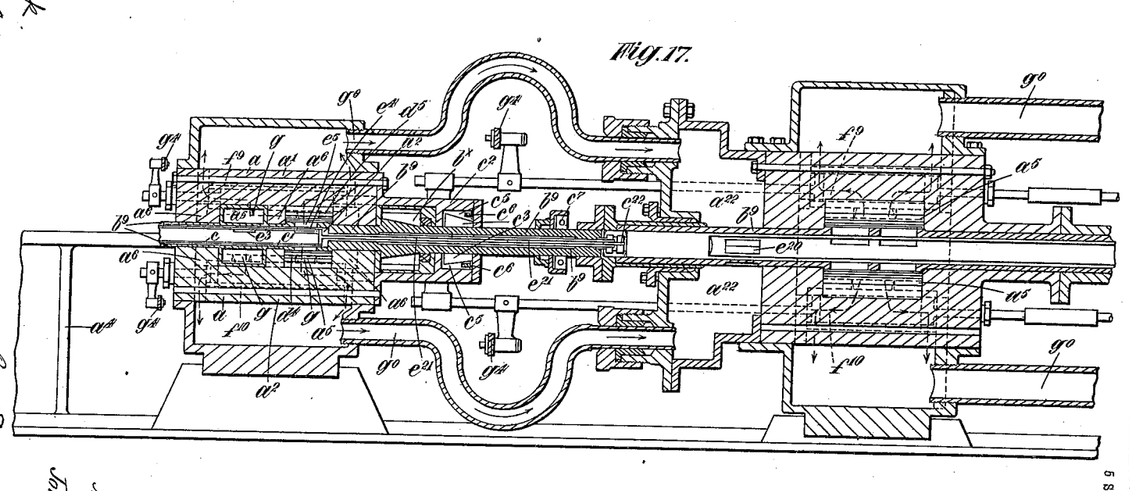
Fig. 17 is a sectional elevation of the form of the engine arranged for compound working.

The improved engine may be compounded by arranging several abutment and rotor chambers along the abutment and rotor shafts Fig. 17, the several chambers and members thereon being of sizes suited to the ratio of expansion required and arranged as previously described to effect the perfect balancing of the engine. The tube or passage in the abutment shaft $b^9$ for admitting the motive fluid is stopped at $a^{21}$ at the high pressure abutment. Between this latter and the expansion abutment or at the outer end thereof, an annular chamber or receiver $a^{22}$ is formed surrounding the hollow shaft $b^9$ of the abutment. This annular chamber is adapted to receive the exhaust motive fluid from the high pressure section of the engine prior to its admission to the expansion section of the engine as shown by the arrows in Fig. 17. Suitable ports $e^{20}$ are formed in the abutment shaft $b^9$ and concentric controlling sleeves and the motive fluid is free to pass through the same to the rotor chambers. The control of the members for admitting the motive fluid to the expansion section of the engine is the same as in the high pressure section but the ports therein are made larger. The two sets of members in the respective sections are coupled together by the shafts $e^{21}$ and coupling $e^{22}$ so as to be capable of simultaneous operation. No cut-off is, however, necessary in the expansion section. The exhaust valves of the respective sections are the same and they may be connected to two operating levers $g^4$ mounted on the same shaft, Figs. 1 and 17, by means of link mechanism so as to be actuated by the same mechanism. It will be seen that a compound engine or an engine of any other order of expansion may be readily obtained by arranging the desired number of sections in the manner described. If desired the last section of the engine could be arranged to exhaust into a condenser and in this way would operate with a vacuum as is the case with condensing engines.

The steam ports and passages pertaining to the engine should be of sufficient area or capacity to keep the velocity of the steam below the maximum rate permissible, and the length of the ports be such that sufficient area is obtained without exceeding a width of 15°. In fact it is desirable to keep the width as much below this amount as possible and particularly so in the first or high pressure cylinder or chamber of a compound or expansion engine of this type.

The effect of the pressure of the motive medium on the axle and consequently on the bearings of the abutment and rotor is obviated in the present invention and the efficiency of the engine considerably increased. By having one rotor on each side of the engine the pressure of the abutment is applied on both sides thereof, and therefore balanced. Again as the axles of the rotors are mounted in ball bearings the loss of power at these points is reduced to a minimum. The engine may be steam jacketed and lagged in the usual way and this would be most necessary if superheated steam was used as the motive medium.

What I claim and desire to secure by Letters Patent of the United States is:—

1. In a rotary engine the combination of a rotary abutment having a depression therein, a rotor, a projection on said rotor adapted to engage with the depression in the abutment, a plurality of sleeves for controlling the admission of motive fluid to said depression, valves for controlling the exhaust from said depression and means in said valves for maintaining communication of the motive fluid between the rotary abutment and rotor.

2. In a rotary engine the combination of a rotary abutment having depressions therein, a plurality of rotors, projections on said rotors adapted to engage the depressions in the abutment, a plurality of concentric sleeves for controlling the admission of motive fluid to the said depressions, valves for controlling the exhaust from said depressions and means in said valves for maintaining or lengthening the period of communication of the motive fluid between the rotary abutment and said rotors.

3. In a rotary engine the combination of a rotary abutment having depressions formed therein, a plurality of rotors, projections on said rotors, adapted to engage with the depressions in the abutment, a plurality of concentric sleeves for controlling the admission of motive fluid to said depressions, valves for controlling the exhaust from said depressions and by-passes formed in said valves for maintaining or lengthening the period of communication of the motive fluid between the rotary abutment and said rotors.

4. In a rotary engine the combination of a rotary abutment having depressions formed therein, a plurality of rotors, projections on said rotors adapted to engage with the depressions in the abutment, a plurality of concentric sleeves for controlling the admission of motive fluid to said depressions, exhaust valves arranged in close proximity to the rotary abutment, radial and circumferential ports in said exhaust valves and pairs of short ports in the engine casing adapted to be placed in communication by the circumferential ports in the exhaust valves.

5. In a rotary engine the combination of a rotary abutment having depressions formed therein, a plurality of rotors, projections on said rotors adapted to engage with the depressions in the abutment, a plurality of concentric sleeves for controlling the admision of motive fluid to said depressions, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

6. In a rotary engine the combination of a sectional casing, means for supporting the sections or parts of said casing on the axial line of the casing, a rotary abutment in said casing having depressions formed therein, a plurality of rotors, projections on said rotors adapted to engage with the depressions in the abutment, a plurality of concentric sleeves for controlling the admission of motive fluid to said depressions, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

7. In a rotary engine the combination of a sectional casing, means for supporting the sections or parts of said casing on the axial line of the casing, a rotary abutment in said casing having depressions formed therein and capable of longitudinal movement in said casing, a plurality of rotors capable of longitudinal movement in the casing, projections on said rotors adapted to engage with the depressions in the abutment, a plurality of concentric sleeves for controlling the admission of motive fluid to said depressions, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

8. In a rotary engine the combination of a sectional casing, means for supporting the sections or parts of said casing on the axial line of the casing, a rotary abutment having depressions formed therein and capable of longitudinal movement in the casing, ball bearings for said abutment, end and peripheral packing pieces thereon, a plurality of rotors capable of longitudinal movement in the casing, projections on said rotors adapted to engage with the depressions in the abutment, a plurality of concentric sleeves for controlling the admission of motive fluid to said depressions, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

9. In a rotary engine the combination of a sectional casing, means for supporting the sections or parts of said casing on the axial line of the casing, a rotary abutment having depressions formed therein and capable of longitudinal movement in the casing, ball bearings for said abutment, packing pieces for said abutment which are constituted by a plurality of parts capable of relative movement, a plurality of rotors capable of longitudinal movement in the casing, projections on said rotors adapted to engage with the depressions in the abutment, a plurality of concentric sleeves for controlling the admission of motive fluid to said depressions, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

10. In a rotary engine the combination of a sectional casing, means for supporting the sections or parts of said casing on the axial line of the casing, a rotary abutment having depressions formed therein and capable of longitudinal movement in the casing, a hollow shaft on which said abutment is mounted and through which the motive fluid passes, a plurality of rotors capable of longitudinal movement in the casing, projections on said rotors adapted to engage with the depressions in the abutment, a plurality of concentric sleeves for controlling the admission of motive fluid to said depressions and which are arranged to extend beyond the hollow shaft of the abutment, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

11. In a rotary engine the combination of a rotary abutment having depressions formed therein, a shaft, a plurality of rotors, wheels on said shaft, tongues arranged between said rotor wheels along the length of the shaft on opposite sides thereof which are adapted to engage with the depressions in the rotary abutment, a plurality of concentric sleeves for controlling the admission of motive fluid to the depressions in the abutment and which are arranged to extend beyond the hollow shaft of the abutment, exhaust valves arranged around the rotary abutment in close proximity thereto, radial and circumferential ports in said exhaust valves, pairs of short ports in the engine casing adapted to be connected by the circumferential ports in the exhaust valves and means for operating said exhaust valves so that diametrically opposed pairs are set in the same position.

In testimony whereof I affix my signature in presence of two witnesses.

JOHN ROBT. HARPER.

Witnesses:
T. SELBY WARDLE,
WALTER J. SKERTEN.

---

Copies of this patent may be obtained for five cents each, by addressing the "Commissioner of Patents, Washington, D. C."